(12) United States Patent
Birman et al.

(10) Patent No.: US 10,101,519 B2
(45) Date of Patent: Oct. 16, 2018

(54) LIGHTING ASSEMBLY FOR DISPLAY ILLUMINATION

(71) Applicant: Continental Automotive Systems, Inc., Auburn Hills, MI (US)

(72) Inventors: Vyacheslav Borisovich Birman, Auburn Hills, MI (US); Richard Daniel Sanders, Clarkston, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 675 days.

(21) Appl. No.: 14/495,343

(22) Filed: Sep. 24, 2014

(65) Prior Publication Data
US 2015/0092390 A1    Apr. 2, 2015

Related U.S. Application Data

(60) Provisional application No. 61/884,173, filed on Sep. 30, 2013, provisional application No. 61/884,225, filed on Sep. 30, 2013.

(51) Int. Cl.
*B60Q 3/10* (2017.01)
*F21V 8/00* (2006.01)
*G02F 1/1335* (2006.01)

(52) U.S. Cl.
CPC .......... *G02B 6/0046* (2013.01); *G02B 6/002* (2013.01); *G02B 6/0053* (2013.01); *G02B 6/0068* (2013.01); *G02F 1/133615* (2013.01); *G02F 2001/133607* (2013.01)

(58) Field of Classification Search
None
See application file for complete search history.

(56) References Cited

U.S. PATENT DOCUMENTS

| | | | |
|---|---|---|---|
| 5,856,855 A | 1/1999 | De Witz et al. | |
| 6,556,258 B1 | 4/2003 | Yoshida et al. | |
| 6,576,887 B2 | 6/2003 | Lamb et al. | |
| 6,724,535 B1 | 4/2004 | Clabburn | |
| 6,773,126 B1 | 10/2004 | Rinko et al. | |
| 6,874,913 B2 | 4/2005 | Munro et al. | |
| 7,356,211 B2 | 9/2008 | Sugiura | |
| 7,448,775 B2 * | 11/2008 | Parker | F21V 5/00 362/330 |
| 7,481,566 B2 | 1/2009 | Han | |

(Continued)

FOREIGN PATENT DOCUMENTS

EP    1538468 A1    6/2005
JP    2000090719 A    3/2000

(Continued)

OTHER PUBLICATIONS

English Translation of Japan Office Action dated Feb. 1, 2016.
English Translation of Japan Office Action dated Sep. 28, 2015.
European Search Report 14186438.9 dated Feb. 13, 2015.

*Primary Examiner* — Andrew Coughlin

(57) ABSTRACT

A lighting assembly for a vehicle instrument panel includes a light guide supported within a light housing proximate to a light source. The light guide includes a top surface with a plurality of prisms for efficiently transmitting light toward a display and operator. The light guide may be coupled to a diffuser with a plurality of serrations that include a light reflecting surface for directing light from the light guide in a direction toward an operator.

3 Claims, 4 Drawing Sheets

(56) References Cited

U.S. PATENT DOCUMENTS

| | | | |
|---|---|---|---|
| 7,593,615 B2 | 9/2009 | Sales et al. | |
| 7,607,808 B2 | 10/2009 | Birman et al. | |
| 2001/0017773 A1* | 8/2001 | Suzuki | G02F 1/133615 |
| | | | 362/23.15 |
| 2001/0035927 A1* | 11/2001 | Sasagawa | G02B 6/0018 |
| | | | 349/113 |
| 2005/0157518 A1 | 7/2005 | Kazuhiro et al. | |
| 2013/0016526 A1* | 1/2013 | McCollum | G02B 3/0056 |
| | | | 362/607 |

FOREIGN PATENT DOCUMENTS

| | | |
|---|---|---|
| JP | 2000105542 A | 4/2000 |
| JP | 2002203411 A | 7/2002 |
| JP | 2004106662 A | 4/2004 |
| JP | 2004119143 A | 4/2004 |
| JP | 2011145612 | 7/2011 |
| JP | 2013187059 A | 9/2013 |

* cited by examiner

LIGHTING ASSEMBLY FOR DISPLAY ILLUMINATION

CROSS REFERENCE TO RELATED APPLICATION

This application claims priority to U.S. Provisional Application No. 61/884,225 and 61/884,173 both filed on Sep. 30, 2013.

BACKGROUND

This disclosure generally relates to a lighting assembly for an instrument cluster display. More particularly, this disclosure relates to a lighting assembly that includes structures for improving light transmission.

Wedge shaped light guides are commonly used for providing digital display illumination. The light guide is supported within a light housing with reflective surfaces. Much of the light from the light is directed outward toward the display at relatively shallow angle and therefore much light is reflected from the light housing resulting in a non-uniform and inefficient distribution of light. A diffuser disposed between the light guide and the display is therefore required to provide a uniform distribution of light to the display.

SUMMARY

An example lighting assembly for a vehicle instrument panel includes a light guide supported within a light housing proximate to a light source. The light guide includes a top surface with a plurality of prisms for efficiently transmitting light toward a display and operator. The light guide may be mated with a diffuser with a plurality of serrations that include a light reflecting surface for directing light from the light guide in a direction toward an operator.

The example lighting assembly directs light more efficiently and enables the use of smaller or fewer light sources to provide the same, or greater illumination of a digital or other vehicle instrument display.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
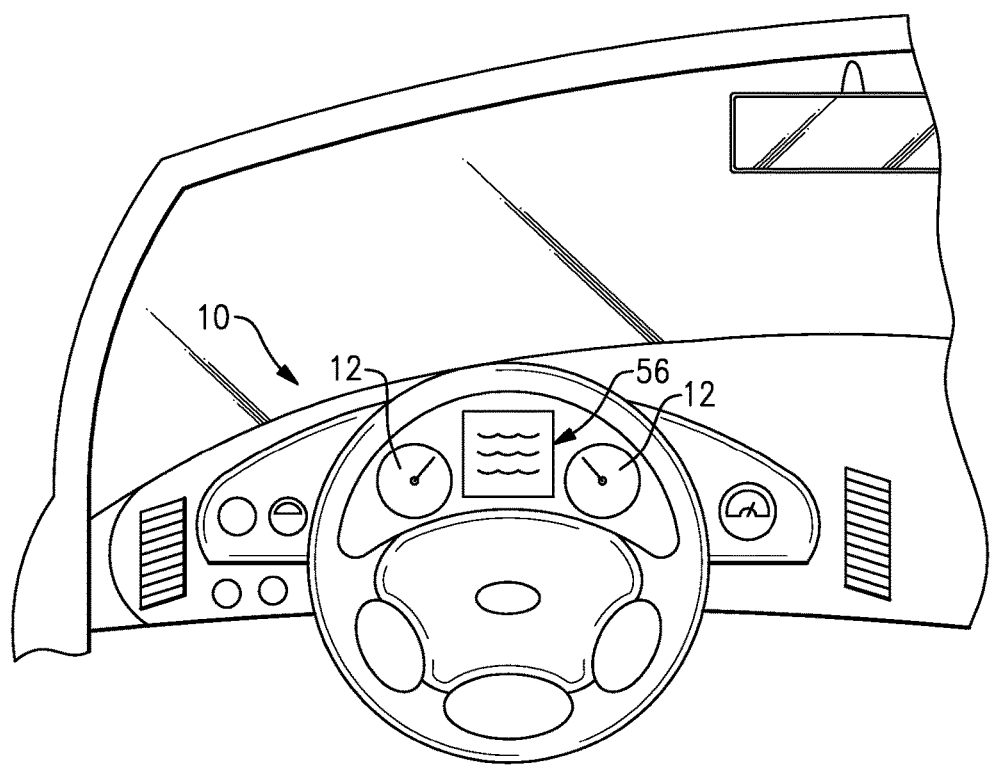
FIG. 1 is a schematic view of a vehicle instrument panel including a digital display.
Figure 2:
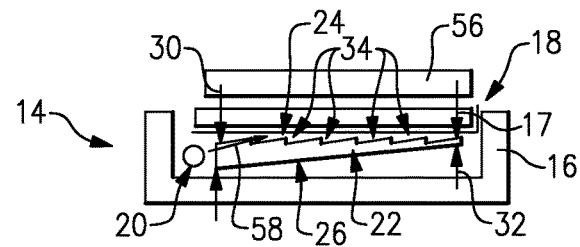
FIG. 2 is a cross-section of an example lighting assembly.

Referring to FIGS. 1 and 2 a vehicle instrument panel 10 includes a plurality of gauges 12 and a centrally located digital display assembly 56. The digital display assembly 56 communicates information relevant to vehicle operation to an operator. The digital display assembly 56 is illuminated by a lighting assembly 14 (FIG. 2). The lighting assembly 14 includes a light source 20 that emits light through a light guide 22. The example digital display 56 may be of any configuration utilizing light from the separate light source 20.

The light source 20 may be of any configuration including but not limited to a light emitting diode (LED). As appreciated, FIG. 2 is a cross-sectional view of the example display assembly 14 and shows a single light source 20. However, the light source 20 may include a plurality of light sources 20 aligned within a light housing 16. The light housing 16 contains light and enables emission of light through an opening 18. The opening 18 is disposed substantially parallel to a surface of the digital display 56. As appreciated, although the assembly 14 is illustrated with the opening 18 facing upwardly, in an installed condition, the opening 18 would face in a direction of the display toward the vehicle operator. This orientation may be at any angle determined to provide a desired viewing angle for a vehicle operator. A light guide 22 is disposed within the light housing 16 sometimes referred to as a light box. The light housing 16 contains reflected light such that light is only emitted in the desired direction toward the display 56.

Figure 3:
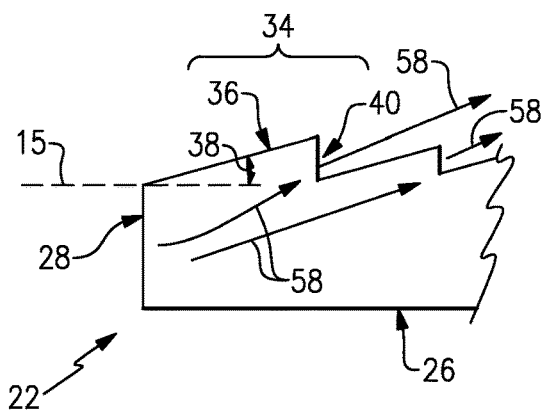
FIG. 3 is an enlarged cross-section of an example light guide.

Referring to FIG. 3, with continued reference to FIG. 2, the example light housing 16 supports the light source 20 at one side and a light guide 22. The light guide 22 includes a top surface 24, a bottom surface 26 and a light receiving surface 28 that is proximate the light source 20. In this example, the light receiving surface 28 is perpendicular to the opening 18. The light guide 22 is wedge shaped with a first width 30 near the light receiving surface 28 and a second width 32 near a distal end of the light guide 22 that is much less then the first width 30. The bottom surface 26 tapers upward toward the top surface 24 in a direction away from the light receiving surface 28 to a terminal end to provide a general wedge shape.

The light source 20 is disposed near the light receiving surface 28 near the end with the first width 30. A diffuser 17 (FIG. 2) is disposed above the light guide to diffuse and uniformly distribute light emitted from the light guide 22 toward a back surface of the display 56. The display 56 can be for an instrument cluster that provides information indicative of an operational parameter of a motor vehicle or other vehicle. In this example, light is emitted through the diffuser 17 toward a back surface of the display 56.

The top surface 24 of the disclosed light guide 22 includes a plurality of prisms 34 that direct light 58 directly to the diffuser 17 rather than reflecting most of the light from surfaces of the light housing 16. Each of the prisms 34 includes a top side 36 and an outlet window 40. The top side 36 is disposed at an angle 38 relative to a plane 15 parallel with the opening 18. In this example, the angle 38 is as small as practical and may be substantially perpendicular to the plane 15 of the opening 18. The example angle 38 is greater than zero and less than 90 degrees. The prisms 34 define a surface through which light 58 exits the light guide 22 and into the diffuser 17. The more direct path of light to the diffuser provides a significant increase light entering the diffuser 17 without reflecting first from surfaces of the light housing 16. The increase in light emitted from the light guide 22 into the diffuser 17 provides an increase in illumination efficiency.

Figure 4:
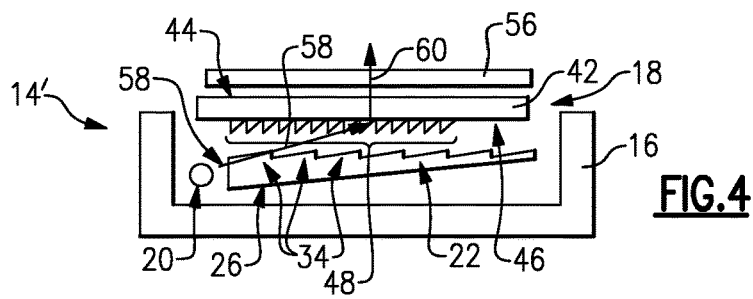
FIG. 4 is a cross-section of another example lighting assembly.
Figure 5:
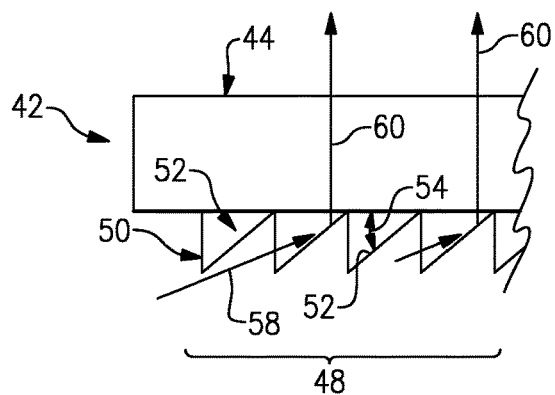
FIG. 5 is an enlarged cross-section of an example diffuser.

Referring to FIGS. 4 and 5, another lighting assembly 14' includes a diffuser 42 with a series of serrations 48 on a bottom surface 44. The diffuser 42 includes a top surface 44 that is parallel to the display 56 and that transmits light 60 in a direction nearly normal to the opening 18 and the display 56. The serrations 48 are structures that rotate light 60 in a direction toward an operator. In other words the serrations 18 turn the light 60 toward a direction perpendicular to the light 58 entering the example light guide 22.

Each of the serrations 48 includes an inlet window 50 that is perpendicular to the opening 18 and a direction of an operator and a light reflecting surface 52. The light reflecting surface 52 is disposed at an angle 54 that reflects and directs light in a direction toward the operator. In this example, the angle 54 is approximately 45 degrees; however other angles could be utilized and are within the contemplation of this disclosure. Moreover, the angle 54 may vary over the individual serrations 48 to correspond with a direction of light received from the light guide 22.

In this example, the serrations 48 are optically coupled to the prisms 34 in the light guide 22. The optical coupling is provided by configuring the outlet window 40 of the light guide 22 (FIG. 3) to the inlet window 50 of the corresponding serration 48 of the diffuser 42. In one example the outlet window 40 of the light guide 22 is aligned with the inlet window 50 of a corresponding serration 48 of the diffuser 42. Alignment in one example includes the outlet window 40 and the inlet window being parallel to each other across the gap between the light guide 22 and the diffuser 42.

Moreover, the number of prisms 34 and corresponding outlet windows 40 of the light housing 22 are provided in relation to the number and size of the number of serrations 48 of the diffuser 42. The size and distance between the prisms 34 and the serrations 48 are determined to provide a desired transmission of light in the direction of an operator.

The serrations 48 may not be across the entire bottom surface 46 of the diffuser 42 but may be absent in areas that do not require the rotation of light toward the operator. For, example portions of the diffuser near the light source 20 may not require serrations 48 to direct light toward an operator.

Figure 6:
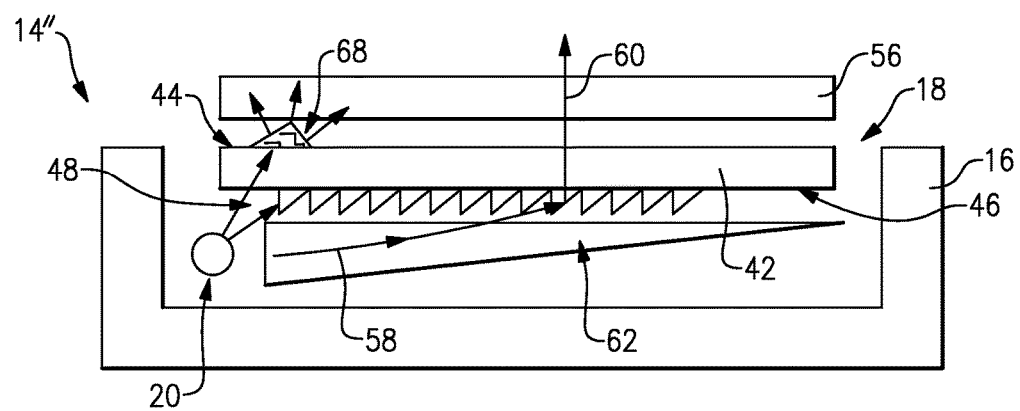
FIG. 6 is a cross-section of another example lighting assembly.

Referring to FIG. 6, another disclosed lighting assembly 14" includes a pyramid prism 68 supported on the top 44 side of the diffuser 42. The pyramid prism 68 is disposed near bright spots. The bright spots can be caused by a close proximity to the light source 20 or other optical characteristics of a specific configuration. The pyramid prism 68 disperses the light to compensate for bright spots and provide a more uniform distribution of light 60 directed to the display 56. In the disclosed example, a plurality of pyramid prisms 68 are disposed on the top surface 44 of the diffuser 42 proximate to the light source 20 and may also be disposed in other locations along the diffuser 42 where bright spots require further diffusion to provide a substantially uniform light distribution along the entire length of the diffuser 46.

Figure 7:
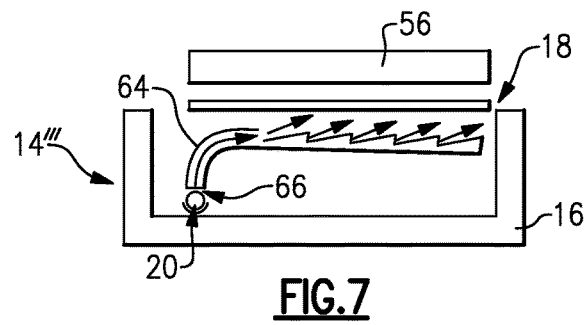
FIG. 7 is a cross-section of another example lighting assembly.

Referring to FIG. 7, another lighting assembly 14''' includes a light guide 64 that includes a light receiving surface 66 disposed substantially parallel to the opening 18 in the light housing 16. The example light guide 64 curves from the light receiving surface 66 into a body portion 70 that extends transversely toward a terminal end. A width of the light guide 64 decreases in a direction away from the light receiving surface 66.

Figure 8:
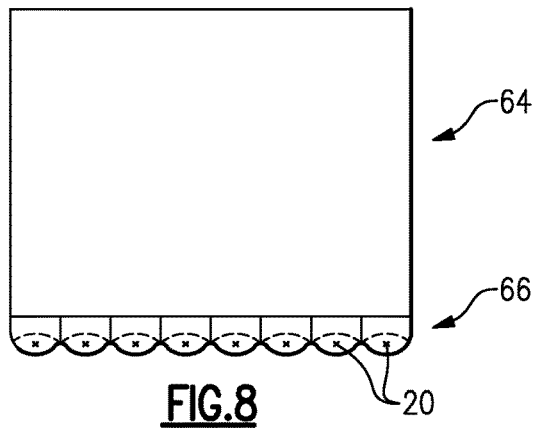
FIG. 8 is a top view of an example light guide.
Figure 9:
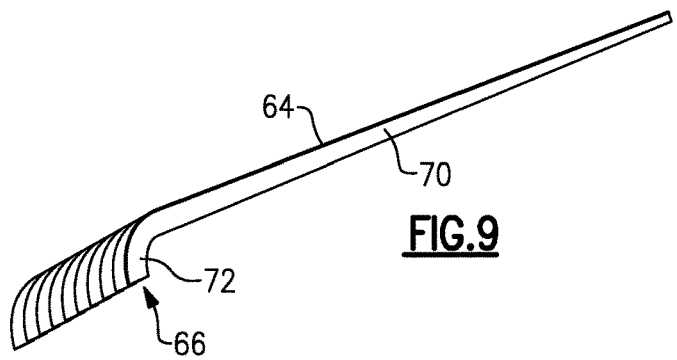
FIG. 9 is a perspective view of the example light guide shown in FIG. 8.
Figure 10:
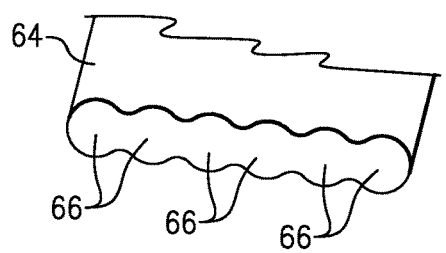
FIG. 10 is a bottom view of a portion of the example light guide.

Referring to FIGS. 8, 9 and 10 with continued reference to FIG. 7, the light receiving surface 66 is mated to a location of each of a plurality of light sources 20 and comprises a round surface that is positioned over a corresponding one of the light sources 20. Each of the round light receiving surfaces 66 is part of a wavy portion 72 that curves into and forms a uniform surface that tapers toward the terminal end. The wavy light receiving surface 66 tapers into the bend portion 72 to provide a thickness modulation at the point where light enters the light guide 62 that further increases light efficiency.

Accordingly, the disclosed lighting assemblies 14 provide a much more efficient transmission of light that increases luminance and enables the use of less or smaller light sources to generate the same or more light for illuminating displays an instrument panels. Although an embodiment of this disclosure has been disclosed, a worker of ordinary skill in this art would recognize that certain modifications would come within the scope of this disclosure.

What is claimed is:

1. A lighting assembly for an instrument display comprising:
   a light housing;
   a display supported over an opening in the light housing;
   a light source within the light housing;
   a light guide including a light receiving surface proximate the light source, a top surface and a bottom surface, wherein the top surface includes a plurality of prisms directing light toward the display, each prism of the plurality of prisms having a planar top side and a planar outlet window, the planar top side of each prism being inclined at an angle relative to a geometric plane that is parallel with the opening in the light housing, the planar window being perpendicular to the opening, the prisms being substantially coplanar with each other and formed such that a second prism is connected to and extends from a first prism, a third prism is connected to and extends from the second prism, wherein the plurality of inclined planes and plurality of outlet windows of the plurality of prisms have a cross sectional shape that is saw-tooth shaped, light emitted from the light source being diffused and emitted from the inclined planar top sides in a direction orthogonal to the opening in the light housing; and
   a diffuser disposed between the light guide and the display for distributing light substantially uniformly on the display, the diffusor being a separate and distinct element from the light guide, the diffusor being substantially flat and without prisms or protrusions.

2. The lighting assembly as recited in claim 1, wherein each of the plurality of prisms outlet windows is transverse to the top surface such that light is directed through the outlet window in a direction transverse to the top surface.

3. The lighting assembly as recited in claim 1, wherein the light guide includes a light receiving surface disposed substantially parallel with the display and the light guide.

* * * * *